United States Patent Office 3,816,425
Patented June 11, 1974

---

3,816,425
POLYOL N,N'',N'''-TRIS[2 - HYDROXY - 3 - (BETA-CYANOETHOXY)PROPYL] - N' - AMINOETHYL-PIPERAZINE
Stephen E. Cantor, and Thomas J. Brett, Jr., Cheshire, Conn., assignors to Uniroyal, Inc., New York, N.Y.
No Drawing. Filed Feb. 18, 1972, Ser. No. 227,647
Int. Cl. C07d 51/70
U.S. Cl. 260—268 CN        1 Claim

ABSTRACT OF THE DISCLOSURE

This invention relates to polyols containing cyanoalkyl ethers, such polyols being useful in the production of elastomeric and rigid urethane polymers and prepolymers thereof.

---

Urethane polymers can have many special characteristics such as resistance to shock, oxidation, fuels and oils, depending upon the type of polymeric polyolpolyether or polyester used in their preparation. Polyester-polyol polyurethanes resist dry-cleaning solvents such as trichloroethylene and carbon tetrachloride, but are susceptible to hydrolysis from bases encountered in detergent washings. Polyether-polyol polyurethanes have the opposite characteristics, having superior hydrolytic stability, especially at high temperatures. The polyurethanes made from the polyether polyols of this invention are resistant both to hydrolysis and to attack by non-polar fluids and, particularly, to dry-cleaning solvents.

The polyols of this invention contain from about 1 to about 20 percent, preferably from about 5.5 to about 15 percent, and, most preferably, from about 7 to about 12% cyano groups by weight, based on the weight of the polyol. They typically have a hydroxyl number from about 25 to about 600, and, preferably, from about 50 to about 500, but they may have hydroxyl numbers outside these ranges. Their molecular weight is typically from about 250 to about 4500, but is preferably from 450 to about 2300. These polyols contain one or more moieties selected from those having the formula (I):

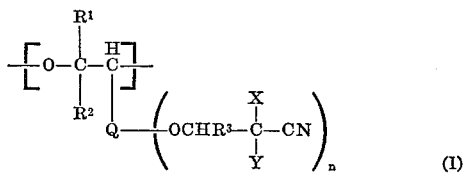

(I)

wherein $R^1$ and $R^2$ are the same or different, and are selected from hydrogen and alkyl groups containing one to four carbon atoms; $R^3$ is hydrogen or an alkyl group containing one to three carbon atoms; X and Y are the same or different, and are selected from the group consisting of hydrogen, fluorine, chlorine, bromine and iodine; $n$ is an integer in the range 1 to 3; and Q has a valence of $n$ plus 1, and is an alkyl group containing 1 to 4 carbon atoms, a cycloalkyl group containing five or six carbon atoms, or phenyl. The moieties of formula (I) in any particular polyol may all be the same, or there may be two or more different kinds of moieties in each, provided that the total hydroxyl number, the total percentage of cyano-nitrogen groups, and the molecular weight of the particular polyol are all within the specified ranges.

The moieties of formula (I) are derived from such compounds as cyanoalkyl- and halocyanoalkyl epoxy ethers. These epoxides are described in copending U.S. Patent Application Ser. No. 227,648, filed on the same day as this case, and in U.S. Pat. 3,410,810, issued Nov. 12, 1968, the disclosures of which are incorporated herein by reference. Briefly, the epoxides of (4339) are compounds of the formula (II):

(II)

wherein $R^4$ and $R^5$ are the same or different, and are hydrogen or an alkyl group of 1 to 4 carbon atoms; $R^6$ is hydrogen or an alkyl group of 1 to 3 carbon atoms; Q has a valence of $n$ plus 1, and is an alkyl group of 1 to 4 carbon atoms, a cycloalkyl group of 5 or 6 carbon atoms, or phenyl; X is halogen such as fluorine, chlorine, bromine or iodine; and $n$ is an integer of 1 to 3.

The polyols may also contain the residue of one or more polyfunctional initiators. These are active-hydrogen-containing compounds which may be monomeric or even higher molecular weight compounds made from more than one kind of active-hydrogen-containing compound. Preferably, the initiator contains from 2 to 8 active sites to which the epoxides described above can add, and is a mono-, di-, tri- or higher aromatic, aliphatic or heterocyclic polyamine, an alcohol such as an aliphatic polyol, or a mixture of two or more of these initiators.

Examples of such initiators are: ethylene glycol, propylene glycol, glycerine, trimethylolpropane, pentaerythritol, arabitol, sorbitol, maltose, sucrose, ammonia, diethanolamine, triethanolamine, dipropanolamine, tripropanolamine, diethanolpropanolamine, tributanolamine, 2,4-toluene diamine, 4,4'-diphenylmethane diamine, p,p', p'' - triphenylmethanetriamine, ethylene - diamine, propylenediamine, propylenetriamine, N,N,N',N'-tetrakis-(2-hydroxypropyl) ethylenediamine, diethylenetriamine, p-amino aniline, 1,5-diamino naphthalene, 2,4-diamino toluene, ethylene diamine, 2,6-diamino pyridine, N-aminoalkylpiperazines and the like. Though not preferred, it is also possible to use aliphatic thiols such as alkyl thiols.

The polyols of this invention may also optionally contain residues of one or more alkylene, arylene, or aralkylene oxides, tetrahydrofuran, or halogenated derivatives of any of these compounds. Any particular polyol of the invention may contain two or more different kinds of such residues provided that the hydroxyl number, cyano-nitrogen content, and molecular weight of the polyol are in the above-described ranges. See U.S. Pat. 3,410,810, columns 2 and 3, for a detailed description of some of these compounds.

Examples of these co-monomers are: tetrohydrofuran, epichlorohydrin, epibromohydrin, ethylene oxide, propylene oxide, butene oxide, isobutylene oxide, vinylchloride epoxide, methallyl chloride epoxide, dichloroisobutylene epoxide, styrene oxide, alpha-methyl-styrene-oxide, divinylbenzene monoxide, isopropyl glycidyl ether, chlorophenyl glycidyl ether, ethyl glycidyl ether, allylglycidyl ether, isopropenyl glycidyl ether, and the like.

The polyols of the invention can be made by reacting one or more cyanoalkyl epoxy ethers or halocyanoepoxy ethers, or both, with a polyfunctional initiator such as ethylene glycol, and, optionally, with tetrahydrofuran, one or more alkylene, arylene, or aralkylene oxides, or some combination thereof in the presence of a Lewis acid catalyst such as boron trifluoride etherate as taught by Murback et al. in Ind. Eng. Chem., Vol. 52, No. 9, p. 772 (1960). The reaction is typically conducted at temperatures in the range of minus 20 to 20 degrees centigrade (C.), at pressures in the range of 1 to 2 atmospheres, and, conveniently, in an inert, non-polar organic solvent such as methylene dichloride.

In practice, the reactants are mixed in any desired order in a common solvent, a solution containing the catalyst is added, and the resulting mixture is stirred for a time period in the range of 4 to 30 hours, usually 10 to 20 hours. The catalyst is deactivated, and the polyol is recovered by solvent extraction or some other convenient method.

The polyols of the invention have many uses, but an important use is in the manufacture of polyurethane polymers and prepolymers. The polyurethane polymers are made in either a one-stage process, which directly produces the elastomeric or rigid polyurethane of the invention, or in a two-stage process, in which first the urethane prepolymers of the invention are formed and, from them, the polyurethane polymers of the invention. Generally, higher molecular weight polyols of this invention are preferred for making the elastomeric polyurethanes; lower molecular weight polyols are preferred for making more rigid polyurethane polymers. The higher the functionality of the polyol of the invention, the greater the probability of forming a rigid polyurethane. As examples 34 and 35 show, the polyurethanes of the invention can be made from mixtures of two or more different polyols, and the mixture may include different polyols within, and outside of, those of this invention. Examples of such polyols are the propoxylated N-aminoethylpiperazines described in U.S. Pat. 3,251,788 and U.S. Pat. 3,251,787.

In the one stage process, one or more of the new polyols are reacted with one or more organic poly isocyanates. The amount of polyisocyanate used is approximately stoichiometrically equivalent to the number of active hydrogen atoms in the polyol. Although an amount of polyisocyanate at least stoichiometrically equivalent to the reactive hydrogen atoms of the polyol should be used for best results, an excess of up to about 2.5 isocyanate groups per reactive hydrogen atom, or even more, can be used.

In the two-stage process, one or more of the new polyols is reacted with one or more organic polyisocyanates in an amount that exceeds the stoichiometric equivalent of the reactive hydrogen atoms in the polyol to obtain a prepolymer having many free, unreacted isocyanate groups. The excess will typically be sufficient to produce at least 3%, and preferably 5 to 7%, by weight, of free isocyanate groups in the prepolymer.

The prepolymer is preferably prepared in a moisture-free atmosphere to prevent premature curing. Typically, the reaction is effected under a nitrogen blanket at a temperature in the range 60° to 100° C. The prepolymer can be prepared in a solvent if desired. Suitable solvents include: monoethylether acetate, xylene, toluene, methylethylketone, methylisobutylketone, cyclohexanone and other alkyl-substituted ketones and acetates, either alone or mixed with each other.

The new prepolymers are converted to polyurethane-type polymers of the invention by curing the prepolymers under atmospheric conditions, where the free isocyanate groups react with the moisture in the air to effect solidification by cross-linking. The curing atmosphere should contain at least 15% relative humidity, and preferably from about 35 to about 65% relative humidity. The temperature of the atmosphere may range from room temperature of about 20° C. to 60° C. If desired, however, the prepolymer can be cured more rapidly at a temperature in the range of 60 to 200° C.

Although the prepolymers cure satisfactorily without catalysts, it is possible to use catalysts such as dibutyl tin dilaurate, trimethylpiperazine, stannous octoate, triethylamine, 1,4-diazole bicyclo-[2,2,2]-octane, and the like, to accelerate the curing process.

The curing can also be effected by employing various chain extending agents in combination with the prepolymers of the invention. The chain extender is preferably employed in an amount that is stoichiometric with respect to the isocyanate-terminated prepolymer. Suitable chain extenders include low molecular weight diols such as butane-1,4-diol, polypropylene diol, oxypropylated aniline, ethylene glycol, catechol oxypropylated ethylene diamine, polyoxypropylene diamine, 4,4'-methylene bis-(o-chloroaniline), and mixtures thereof.

Among the organic polyisocyanates which can be used in either the one- or two-stage processes of making the polyurethanes of the invention are cyclic and acyclic aliphatic polyisocyanates, heterocyclic polyisocyanates, and aromatic polyisocyanates. Best results are obtained with aromatic polyisocyanates, and they are preferred. Diisocyanates, most preferred, include compounds such as hexamethylene diisocyanate, cyclohexyl diisocyanate, 2,6-toluylene diisocyanate, 2,4-toluylene diisocyanate, 4,4'-diphenylmethane diisocyanate, 4,4'-diphenyldimethylmethane diisocyanate, 1,5-naphthalene diisocyanate, 1-methyl-2,4-diisocyanate-5-chlorobenzene, 2,4-diisocyanate-s-triazine, 1-methyl-2,4-diisocyanato-cyclohexenene, p-phenylene diisocyanate, 1,4-naphthalene diisocyanate, 4,4',4''-triphenylmethane triisocyanate, the urea diisocyanates, and the dimers, trimers and other polymers of polyisocyanates, and the like.

If desired, the polyurethanes of the invention can be made into foams by incorporating a foaming agent in the urethane reactants causing the polyurethane to expand as it forms.

The following examples illustrate the preparation of the polyols of this invention, their conversion to polyurethane prepolymers and polymers, and the high resistance of the polyurethanes to both polar and non-polar fluids.

EXAMPLES 1 TO 12

Preparation of Polyols

Example 1

A 250-milliliter (ml.), 3-necked flask, fitted with a stirrer, thermometer, and dropping funnel, was charged with 43 grams (0.6 mole) of pure, dry tetrahydrofuran, 6.1 grams (0.1 mole) of ethylene glycol, 52 grams (0.4 mole) cyanoethyl glycidyl ether and 170 grams (1.7 mole) of 1,2-dichloroethane. The solution was cooled to a temperature in the range $-10°$ to $-5°$ C. in an isopropanol/Dry Ice bath. Then 40 grams (0.98 mole) of ethylene oxide was added. Finally, 14 grams (0.1 mole) of boron trifluoride etherate catalyst diluted with 50 grams of 1,2-dichloromethane was added slowly over a period of 1.5 hours while the temperature was maintained in the $-10°$ to $-5°$ C. range. The reaction mixture was stirred for 19 hours while maintaining the temperature at about 3° C., after which time 40 grams of a 10% ammonium hydroxide solution was added to neutralize the catalyst. The resulting cloudy solution was washed three times with 100 milliliter portions of 10% sodium chloride and 1% sodium bicarbonate. The organic layer was collected and dried over anhydrous magnesium sulphate and filtered in order to remove the drying agent. The solvent was removed from the organic layer by distillation, and the remaining viscous oil was heated to 160° C. (3 millimeters Hg pressure) for one hour to remove any remaining cyanoethylglycidyl ether monomer. The polyol yield was 100 grams (70%) having Brookfield viscosity of 1090 centipoises at room temperature.

The product had a negligible acid number, contained 3.89% nitrogen by weight, had a hydroxyl number of 82.2 and a molecular weight of 1350. The 3.89% nitrogen indicated 35% incorporation of cyanoethylglycidyl ether in the polyol.

A series of polyols was prepared in similar fashion from combinations of cyanoethylglycidyl ether and various cyclic oxides. Results for examples 2 to 12 are summarized in Table I. The polyols of examples 2 to 11 are within this invention. The polyol of example 12, a comparative example, is not within the invention.

In Table I, various abbreviations are used for simplicity. Their meanings are: CEGE—cyanoethylglycidyl ether; THF—tetrahydrofuran; PO—propylene oxide; EO—ethylene oxide; ECH—epichlorohydrin; EBH—epibromohydrin; ECD—ethylene dichloride BF$_3$—boron trifluoride-etherate; and EG—ethylene glycol.

EXAMPLES 23 TO 32

Preparation of cured polyurethanes from the prepolymers of examples 13 to 22

Each of the prepolymers of examples 13 to 22 were converted to cured elastomeric polyurethanes using the following general procedure:

Procedure

Each prepolymer was heated to a temperature of about 100° C. in an open, 250-ml. beaker. A polyamine was heated to a separate beaker until it melted. The hot, molten polyamine was poured into the beaker containing

TABLE I.—PREPARATION OF POLYETHER POLYOLS

| Example number | 2 | 3 | 4 | 5 | 6 | 7 | 8 | 9 | 10 | 11 | 12 |
|---|---|---|---|---|---|---|---|---|---|---|---|
| Monomers, moles: | | | | | | | | | | | |
| CEGE | 2.36 | 1.77 | 1.18 | 0.59 | 1.18 | 2.0 | 1.2 | 0.5 | 1.0 | 0.81 | |
| THF | | 1.04 | 2.08 | 2.08 | 1.04 | | 1.8 | | | 0.35 | 2.6 |
| PO | | | | 1.29 | 1.29 | | | | | | |
| EO | | | | | | 0.33 | 3.0 | 0.08 | | 0.3 | .9 |
| ECH | | | | | | | | | 3.0 | | |
| EBH | | | | | | | | | | 0.7 | |
| Solvent: EDC, grams | 930 | 780 | 780 | 780 | 780 | 1,000 | 600 | 200 | 600 | 1,000 | ca. 900 |
| Catalyst, moles: | | | | | | | | | | | |
| BF$_3$ | 0.298 | 0.296 | 0.074 | 0.074 | 0.296 | 0.24 | 0.30 | 0.05 | 0.30 | 0.26 | 0.018 |
| EG | 0.296 | 0.296 | 0.074 | 0.074 | 0.296 | 0.22 | 0.30 | 0.05 | 0.30 | 0.22 | 1.00 |
| Reaction temp., °C | −10-+10 | −10-+10 | −10-+10 | −10-+10 | −10-+10 | −15-+8 | −10-+10 | −10-+10 | −10-+10 | −10-+5 | 3 |
| Reaction period, hrs | ca. 12 | ca. 12 | ca. 12 | ca. 12 | ca. 12 | 19 | 20 | 20 | 18 | 10 | 20 |
| Yield, percent | 55 | 79 | 65 | 67 | 82 | 78 | 85 | 78 | 65 | 84 | 63 |
| Polymer: | | | | | | | | | | | |
| CEGE, percent (weight) | 100 | 77 | 62.5 | 27.5 | 50 | 96 | 85 | 98 | 28 | | |
| Hydroxyl number | 79 | 90 | 59 | 41 | 65 | 131 | 82 | 150 | | | 83 |

EXAMPLE 13

Polyurethane Prepolymer Prepared From Polytetramethylene Glycol (Comparative Example)

Into a 550 milliliter (ml.) resin kettle, fitted with a thermometer and a stirrer, were placed 28 grams (0.16 mole) of tolylene-2,4-diisocyanate (TDI) and 100 grams (g.) (0.1 mole) of a commercially available polytetramethylene glycol (Polymeg 1000—Quaker Oats Co.) having a molecular weight of 1000. These materials were stirred at a temperature of 80° C. for four hours under a nitrogen atmosphere, resulting in 122 g. of a thick, light-brown urethane prepolymer having an amine equivalent of 1317 and an isocyanato group content of 3.12% by weight of the prepolymer.

EXAMPLES 14 TO 22

Prepolymers Prepared From the Polyols of Examples 1 to 12

Several of the polyether polyols whose preparation and properties are described in examples 1 to 12 and Table I were converted to polyurethane prepolymers using generally the procedure described in example 13. The results are summarized in Table II. This table shows that the polyols of this invention are readily converted into prepolymers, for the prepolymer yield exceeded 90 percent by weight of the theoretical yield in each of the examples of the invention.

the hot prepolymer, and the resulting mixture was stirred vigorously for 30 seconds. The mixture was poured into a mold preheated to about 50° C., and the mold was subjected to a pressure of about 200 atmospheres to effect cure. Curing time and temperature, and the properties of each polyurethane produced, are summarized in Table III.

The amount of polyamine—about 90 percent of the amine equivalent of the prepolymer—was calculated from the following equation:

$$\frac{g. \text{ PA}}{100 \text{ g. PP}} = 90 \ (\overline{PA}/F)/AE$$

wherein PA means polyamine; PP, prepolymer; $\overline{PA}$, molecular weight of the polyamine; F, the functionality of the polyamine, and AE, the amine equivalent of the prepolymer.

In Table III, the abbreviations CEGE, PO and EO have the meanings given above in connection with Table I. PTMG means poly(tetramethylene glycol); TCE, trichloroethylene. Fuel B is a mixture of isooctane (70% by weight) and toluene (30% by weight).

TABLE II.—POLYURETHANE PREPOLYMER PREPARATION

| Example number | 14 | 15 | 16 | 17 | 18 | 19 | 20 | 21 | 22 |
|---|---|---|---|---|---|---|---|---|---|
| Polyol (example) | (12) | (1) | (2) | (3) | (4) | (5) | (6) | (7) | (8) |
| Polyol, grams | 83 | 83 | 89 | 199 | 121 | 163 | 100 | 100 | 73 |
| TDI, grams | 28 | 28 | 23 | 55 | 27.5 | 31 | 34 | 28 | 28 |
| Reaction temp., °C | 83 | 83 | 80 | 80 | 80 | 80 | 80 | 83 | 83 |
| Reaction period, hrs | 3 | 4 | 4 | 4 | 4 | 4 | 4 | 3 | 3 |
| Yield, grams | 107 | 109 | | | | | | | |
| Amine equivalent | 626 | 609 | 1,273 | 1,480 | 1,037 | 925 | 1,072 | 835 | 831 |
| Isocyanate content, percent (weight) | 6.55 | 6.85 | 3.30 | 2.84 | 4.06 | 4.54 | 3.82 | 5.03 | 5.07 |

TABLE III.—PREPARATION OF CURED POLYURETHANES

| Example number | 23 | 24 | 25 | 26 | 27 | 28 | 29 | 30 | 31 | 32 |
|---|---|---|---|---|---|---|---|---|---|---|
| Polyether polyol (example) | | (12) | (2) | (3) | (4) | (5) | (6) | (7) | (1) | (82) |
| Composition, percent weight: | | | | | | | | | | |
| CEGE | | | 100 | 77 | 72.5 | 28 | 50 | 96 | 35 | 35 |
| PTMG | 100 | 82.5 | | 23 | 37.5 | *36 | *25 | | 65 | *32.5 |
| PO | | | | | | *36 | *25 | | | |
| EO | | 17.5 | | | | | | 4 | | *32.5 |
| Hydroxyl number | 512 | 83 | 79 | 90 | 59 | 41 | 64 | 131 | 82 | 82 |
| Polyurethane prepolymer (example) | (13) | (14) | (16) | (17) | (18) | (19) | (20) | (21) | (15) | (22) |
| Amine equivalent | 1,317 | 626 | 1,273 | 1,480 | 1,037 | 925 | 1,072 | 835 | 609 | 831 |
| Polyurethane preparation: | | | | | | | | | | |
| Prepolymer, grams | 40 | 40 | 60 | 60 | 60 | 60 | 60 | 60 | 40 | 60 |
| MOCA, grams | 3.8 | 7.6 | 5.6 | 4.9 | 6.9 | 7.8 | 6.7 | 5.8 | 6.8 | 5.8 |
| Cure temp., °C | 104 | 100 | 104 | 104 | 104 | 104 | 104 | 100 | 104 | 104 |
| Cure period, minutes | 50 | 60 | 60 | 60 | 60 | 60 | 60 | 60 | 50 | 60 |
| Post-cure temp., °C | 49 | 49 | | | | | | 70 | 49 | 70 |
| Post-cure period, hrs | 24 | 24 | | | | | | 24 | 24 | 24 |
| Polyurethane, physical properties: | | | | | | | | | | |
| 100% modulus, p.s.i | 500 | 630 | 320 | 330 | 650 | 320 | 350 | 1,040 | 640 | 310 |
| Tensile strength, p.s.i | 2,500 | 4,100 | 850 | 790 | 1,120 | 1,010 | 910 | 1,710 | 1,230 | 1,030 |
| Elongation at break, percent | 600 | 460 | 260 | 420 | 320 | 540 | 420 | 150 | 300 | 420 |
| Hardness, Shore A | 80 | 85 | 66 | 67 | 84 | 74 | 69 | 91 | 84 | 70 |
| Swell in fuel B, percent | 37.1 | 28 | 0.7 | 1.4 | 1.4 | 7.2 | 3.9 | 0.6 | 4.6 | 3.8 |
| Swell in TCE, percent | 196 | 177 | 4.5 | 66.9 | 59 | 108 | 79 | 3.5 | 70 | 109 |
| Swell in water, percent | 1.1 | 3.9 | 6.8 | 4.2 | 3.2 | 2.4 | 8.0 | 4.2 | 5.3 | 7.6 |

*Calculated.

The data in Table III show the dramatic and unexpected improvement in solvent resistance of the polyurethanes of this invention (examples 25–32) over the prior art polyurethanes of examples 23 and 24, even where the nitrile content is as low as 5.6% by weight (example 28). Most remarkable is the high resistance to swelling in Fuel B, even with polyurethane elastomers having low crosslink densities, without substantial loss of the high water resistance such polyurethanes typically have.

EXAMPLE 33

Preparation of N,N",N"-tris[2-hydroxy-3-(beta-cyanoethoxy)propyl]-N'-aminoethylpiperazine Into a one-liter, three-necked round-bottomed flask, equipped with a stirrer, a thermometer, a dropping funnel and inlet and outlet tubes for dry nitrogen were placed 42.2 grams (0.33 mole) of N-aminoethylpiperazine. This compound, a liquid, was heated with an oil bath to about 70° C. while a stream of dry nitrogen was passed continuously over the heated liquid. Then 127 grams (1 mole) of CEGE was added incrementally over a period of 2¼ hours while the reaction mixture was maintained at a temperature of 75 to 88° C.

After all the CEGE was added, the mixture was maintained at a temperature of 83° C. for two hours, after which time 155 g. of product, a clear, reddish, viscous material was isolated. The product was soluble in water and acetone, had a hydroxyl number of 397.7, and showed absorptions of 3500 and 2240 cm.$^{-1}$ upon infra-red analysis. These values are characteristic of hydroxyl and cyano groups.

The polyol prepared in this example was used to prepare the new flexible and rigid polyurethane foams of examples 34 and 35. Both new foams had excellent resistance to polar and non-polar solvents.

EXAMPLE 34.—PREPARATION OF FLEXIBLE POLYURETHANE FOAM

| Recipe, grams | | A (invention) | B (control) |
|---|---|---|---|
| (1) | Polyol I | 85 | 85 |
| (2) | Polyol II | | 15 |
| (3) | HCAP | 15 | |
| (4) | Water | 3 | 3 |
| (5) | TMAP | 1 | 0.5 |
| (6) | Surfactant | 0.05 | 0.1 |
| (7) | PIC | 52 | 48.2 |
| (8) | Catalyst | | 0.2 |

NOTE.—See the following:
(1)=Ethoxy-capped propoxylated glycerine, molecular weight 4,700.
(2)=Propoxylated N-aminoethylpiperazine.
(3)=N,N",N"-tris[2-hydroxy-3-(beta-cyanoethoxy) propyl]-N'-aminoethylpiperazine.
(5)=Trimethylaminoethylpiperazine.
(6)=Dimethylsiloxane oil.
(7)=Polyisocyanate: 70% tolylene diisocyanate 30% crude 4,4'-diphenylmethane diisocyanate.
(8)=Organotin catalyst.

The above ingredients except for (7) were thoroughly blended in a beaker at room temperature, then the polyisocyanate was added while stirring for about 10 seconds. In both cases a vigorous reaction started within a few seconds resulting in a flexible polyurethane foam.

When contacted with methylene dichloride foam B (control) disintegrated within about 1 hour at room temperature whereas foam A (invention) maintained its structural integrity.

EXAMPLE 35.—PREPARATION OF RIGID POLYURETHANE FOAM

| | Recipe, grams | A (invention) | B (control) |
|---|---|---|---|
| (1) | Polyol III | 50 | 50 |
| (2) | Polyol II | | 50 |
| (3) | HCAP | 50 | |
| (4) | Surfactant | 1.5 | 1.5 |
| (5) | Chelating agent | 1.0 | 1.0 |
| (6) | Blowing agent | 12.0 | 12.0 |
| (7) | Water | 0.025 | 0.025 |
| (8) | Catalyst | 1.15 | 1.5 |
| (9) | Polyisocyanate | 122 | 107 |

NOTE.—See the following:
(1)=Glycerine initiated polyether polyol, molecular weight 400.
(2)=As in example 34.
(3)=As in example 34.
(4)=Organosilicone.
(5)=Acetylacetone.
(6)=Trichlorofluoromethane.
(8)=Dimethylethanolamine.
(9)=Crude 4,4'-diphenylmethane diisocyanate.

The above ingredients, with the exception of the polyisocyanate, were thoroughly mixed in a beaker at room temperature and then (9) was added while stirring for about 15 seconds. After a few seconds the reaction started, leading in both cases to rigid polyurethane foams. The polymer A showed improved solvent resistance over polymer B.

We claim:
1. The polyol N,N",N"-tris[2-hydroxy-3-(beta-cyanoethoxy)propyl]-N'-aminoethylpiperazine.

No references cited.

DONALD G. DAUS, Primary Examiner

R. D. McCLOUD, Assistant Examiner

U.S. Cl. X.R.

260—2A, 77.5 AQ, 464, 465 F, 465.6